(12) United States Patent
Huang et al.

(10) Patent No.: US 11,340,646 B1
(45) Date of Patent: May 24, 2022

(54) MINING MACHINE POWER ADJUSTMENT METHOD

(71) Applicant: Shenzhen MicroBT Electronics Technology Co., Ltd., Shenzhen (CN)

(72) Inventors: Lihong Huang, Shenzhen (CN); Weibin Ma, Shenzhen (CN); Zuoxing Yang, Shenzhen (CN); Yuefeng Wu, Shenzhen (CN); Haifeng Guo, Shenzhen (CN)

(73) Assignee: Shenzhen MicroBT Electronics Technology Co., Ltd., Shenzhen (CN)

( * ) Notice: Subject to any disclaimer, the term of this patent is extended or adjusted under 35 U.S.C. 154(b) by 0 days.

(21) Appl. No.: 17/434,376

(22) PCT Filed: May 7, 2021

(86) PCT No.: PCT/CN2021/092085
§ 371 (c)(1),
(2) Date: Aug. 26, 2021

(87) PCT Pub. No.: WO2021/249072
PCT Pub. Date: Dec. 16, 2021

(51) Int. Cl.
*G06F 1/00* (2006.01)
*G05F 1/67* (2006.01)
(Continued)

(52) U.S. Cl.
CPC .............. *G05F 1/67* (2013.01); *G06F 1/324* (2013.01); *G06F 1/3296* (2013.01)

(58) Field of Classification Search
CPC .......... G06F 1/67; G06F 1/324; G06F 1/3296
See application file for complete search history.

(56) References Cited

U.S. PATENT DOCUMENTS

2021/0027223 A1* 1/2021 Koide ............... G06Q 10/06312
2021/0135889 A1* 5/2021 Tai ........................ H04L 9/3297

FOREIGN PATENT DOCUMENTS

CN       205566095 U      9/2016
CN       106371540 A      2/2017
(Continued)

OTHER PUBLICATIONS

International Search Report for Application No. PCT/CN2021/092085, dated Jul. 19, 2021.
(Continued)

*Primary Examiner* — Nitin C Patel
(74) *Attorney, Agent, or Firm* — Marshall, Gerstein & Borun LLP

(57) ABSTRACT

Disclosed is a mining machine power adjusting method, including: when a mining machine is in a working stage, collecting an input voltage of the mining machine; adjusting a maximum working power of the mining machine to a first power value by controlling a working frequency and an output voltage of the mining machine when the input voltage is lower than a pre-determined voltage threshold; and adjusting the maximum working power to a second power value by controlling the working frequency and the output voltage of the mining machine when the input voltage is higher than or equal to the voltage threshold, where the first power value is the product of the input voltage multiplied by a rated current of the mining machine, and the second power value is the product of the voltage threshold multiplied by the rated current. According to the disclosure, the power of the mining machine is adjusted according to changes in the input voltage by fully utilizing a voltage range slightly higher than a standard input voltage, so that the calculation power of the mining machine can be greatly increased to achieve better mining revenues without significantly increasing the power (Continued)

consumption ratio of the mining machine while ensuring the stable and safe running of the mining machine.

10 Claims, 1 Drawing Sheet

(51) Int. Cl.
*G06F 1/3296* (2019.01)
*G06F 1/324* (2019.01)

(56) References Cited

FOREIGN PATENT DOCUMENTS

| | | |
|---|---|---|
| CN | 108919124 A | 11/2018 |
| CN | 109245194 A | 1/2019 |
| CN | 109519984 A | 3/2019 |
| CN | 110771001 A | 2/2020 |
| CN | 111781985 A | 10/2020 |
| JP | 2020009121 A | 1/2020 |

OTHER PUBLICATIONS

Office Action in corresponding Chinese Application No. 202010534205.3, dated Feb. 3, 2021.
First Search Report in corresponding Chinese Application No. 2020105342053, dated Feb. 10, 2021.
Supplementary Search Report in corresponding Chinese Application No. 2020105342053, dated Apr. 27, 2021.
Notification to Grant Patent Right for Invention in corresponding Chinese Application No. 202010534205.3, dated May 8, 2021.

* cited by examiner

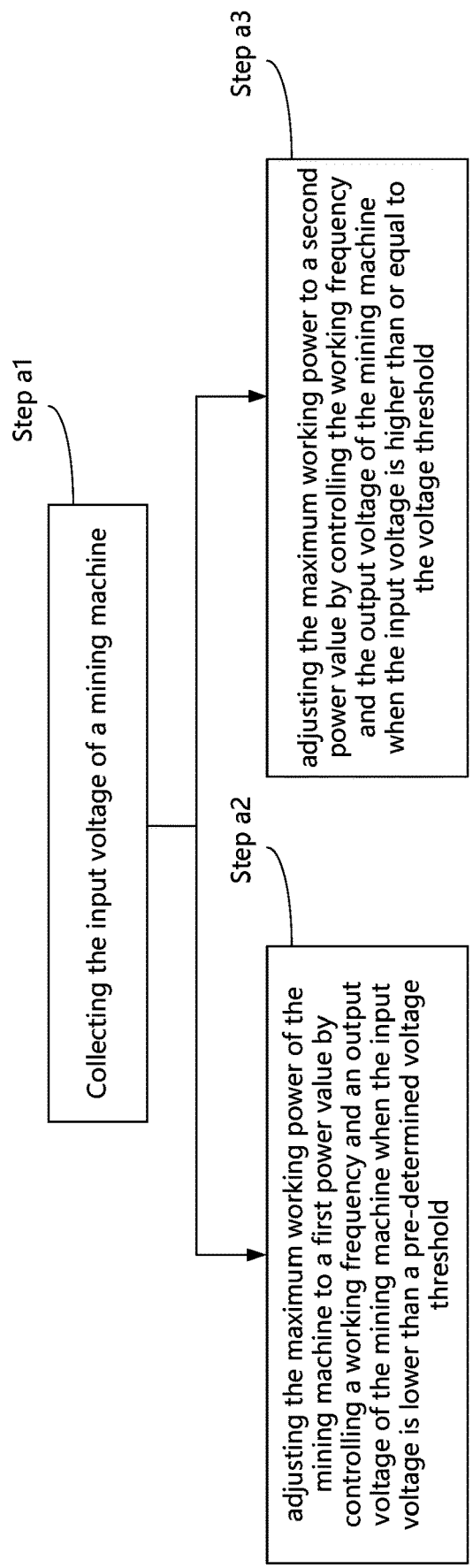

MINING MACHINE POWER ADJUSTMENT METHOD

TECHNICAL FIELD

The disclosure relates to computer technologies, and particularly to a power adjusting method.

BACKGROUND ART

In the virtual currency technology, mining machines are terminal devices which perform computing to solve problems and earn an amount of virtual currency (e.g. bitcoins). Under the constraints of the blockchain technology, mining machines need to perform a huge number of computations in order to obtain possible rewards (virtual currency) from a blockchain system.

A virtual currency mine often includes hundreds, thousands, or even tens of thousands of mining machines which run simultaneously to perform mining tasks and gain rewards of virtual currency. In order to maximize the profits, mining machines are often running continuously for a long time. Therefore, safe running of mining machines is a requirement to ensure profits and safety of the mine.

Currently, as an extended computer technology, mining machines are generally powered by alternating current and thus are under corresponding power restrictions. For example, some mining machines have a standard input voltage of 220 V (volts), a standard frequency of 50 Hz (hertz) with a rated current restricted to 16 A (amps). Therefore, the input current of a mining machine should not exceed 16 A for a long time, otherwise an accident against safety may occur. In order to ensure the safety of mining machines, a common practice is limiting the working power of the mining machines to avoid excessive input current of the mining machines. It can be seen from the following formula:

$$P = U \cdot I$$

when the power P is limited to a constant value, the voltage U becomes inversely proportional to the current I, and thus the input current of a mining machine can be controlled not to exceed the rated current for a long time with the fluctuations in the voltage after limiting the working power of the mining machine within an upper limit.

Although the above approach can ensure stable and safe running of the mining machines, the working efficiency (mining potential) of the mining machines cannot be further increased due to the restrictions on the working power.

SUMMARY OF THE INVENTION

In view of the above, the disclosure provides a mining machine power adjusting method to increase the working efficiency of a mining machine while ensuring stable and safe running of the mining machine.

The technical solutions of the disclosure may be implemented as follows:

A mining machine power adjusting method may include: when a mining machine is in a working stage,
  collecting an input voltage of the mining machine;
  adjusting a maximum working power of the mining machine to a first power value by controlling a working frequency and an output voltage of the mining machine when the input voltage is smaller than a pre-determined voltage threshold; and
  adjusting the maximum working power to a second power value by controlling the working frequency and the output voltage of the mining machine when the input voltage is greater than or equal to the voltage threshold;
  the first power value is the product of the input voltage multiplied by a rated current of the mining machine, and the second power value is the product of the voltage threshold multiplied by the rated current.

A non-transitory computer-readable storage medium stores instructions executable by at least one processor to perform the steps of any of the above mining machine power adjusting method.

From the above technical schemes it can be seen that, through the mining machine power adjusting method of the disclosure, the power of a mining machine can be adjusted according to changes in the input voltage by fully utilizing a voltage range slightly higher than a standard input voltage, so as to greatly increase the calculation power of the mining machine to achieve better mining revenues without significantly increasing the power consumption ratio of the mining machine while ensuring the stable and safe running of the mining machine. For example, when the input voltage is greater than 230 V, the technical schemes of the disclosure can increase the calculation power of the mining machine by more than 5% compared with conventional technical solutions.

BRIEF DESCRIPTION OF THE DRAWINGS

FIG. 1 is a flowchart illustrating a mining machine power adjusting method according to embodiments of the disclosure.

DETAILED DESCRIPTION OF THE INVENTION

In order to make the objectives, technical solutions and merits of the disclosure more apparent, some embodiments will be described in detail hereinafter with reference to the accompanying drawings.

A mining machine power adjusting method according to embodiments of the disclosure may be performed by a power adjusting device. The power adjusting device may be a standalone device or may be a component of a mining machine, e.g. a mining machine control board, or the like. The power adjusting device may be implemented by a dedicated hardware circuit, or a processing circuit executing software instructions.

As shown in FIG. 1, the mining machine power adjusting method provided by the disclosure may include the following steps when a mining machine is in a working stage.

In step a1, an input voltage of a mining machine is collected.

In step a2, when the input voltage is lower than a pre-determined voltage threshold, the maximum working power of the mining machine is adjusted to a first power value by controlling the working frequency and the output voltage of the mining machine.

In step a3, when the input voltage is higher than or equal to the voltage threshold, the maximum working power is adjusted to a second power value by controlling the working frequency and the output voltage of the mining machine.

The first power value is the product of the input voltage multiplied by the rated current of the mining machine, and the second power value is the product of the voltage threshold multiplied by the rated current of the mining machine.

In an embodiment, the voltage threshold is configured to be a value larger than the value of a standard voltage. For example, the voltage threshold may be configured to be any value within the scope of 1 to 1.5 times of the value of the standard voltage. For example, when the standard voltage is 220 V, the voltage threshold may be configured to be 235 V.

In an embodiment, the rated current of the mining machine is generally determined by the power supply line for the mining machine and is typically any value between 10 A and 20 A. For example, the rated current may be 16 A.

In an embodiment, the mining machine power adjusting method provided by the disclosure may be performed once in every pre-determined time period, i.e. the steps of collecting the input voltage (i.e. step a1), determining whether the input voltage is lower than the voltage threshold and adjusting the maximum working power (i.e. step a2 and step a3) are performed once in every interval with a duration of the time period. The pre-determined time period may be any value between 1 h (hour) and 100 h. For example, the pre-determined time period may be 24 h.

In some embodiments, in order to ensure safe running of mining machines and prevent a sudden over current from causing damages to the mining machines or even starting a fire, the mining machine power adjusting method provided by the disclosure may also include the following steps.

the input current of the mining machine is measured in real time, and when the input current exceeds a pre-defined current threshold, the working frequency and the output voltage of the mining machine are reduced.

The current threshold is 1.05 to 1.2 times of the rated current. For example, the current threshold may be 1.1 times of the rated current. In an embodiment, the working frequency of a mining machine refers to the working frequency of a calculation board of the mining machine, and the output voltage of the mining machine refers to the voltage output to the calculation board from a power supply module of the mining machine.

During the startup stage of the mining machine, the frequency of the calculation board gradually increases, i.e. there is a frequency boosting stage during the startup of the mining machine. The frequency boosting stage of the mining machine is a stage when the frequency of the calculation board ascends from an initial lower frequency to a target frequency (e.g. a frequency near or equal to the working frequency). Based on the above controlling steps during the working stage of the mining machine, the mining machine power adjusting method provided by the disclosure may also include the following steps during the frequency boosting stage of the mining machine.

In step b1, the input voltage of a mining machine is collected when the mining machine starts up.

In step b2, when the input voltage is lower than the voltage threshold, the first power value is determined to serve as a reference power value for the frequency boosting stage.

In step b3, when the input voltage is higher than or equal to the voltage threshold, the second power value is determined to serve as the reference power value.

In step b4, a target power value range of the mining machine during the frequency boosting stage is determined according to the reference power value.

In step b5, the power value of the mining machine during the frequency boosting stage is controlled within the target power value range by controlling the working frequency and the output voltage of the mining machine during the frequency boosting stage.

The first power value is the product of the input voltage multiplied by the rated current of the mining machine, and the second power value is the product of the voltage threshold multiplied by the rated current.

Through the above steps, the working power of the mining machine can be controlled within the target power value range when the mining machine exits the frequency boosting stage and enters the working stage. If the working power is not constrained within the target power value range, based on the following formula:

$$I = P/U$$

a dangerous situation may occur that the input current of the mining machine becomes too large due to the working power being too high, or there may be a startup failure due to the working power being too low.

In some embodiments, the target power value range of the mining machine during the frequency boosting stage in step b4 may be determined according to the reference power value by using the following sub-steps.

The difference between the reference power value and the first pre-determined power value is determined to serve as the upper limit of the target power value range;

the difference between the reference power value and the second pre-determined power value is determined to serve as the lower limit of the target power value range;

the first pre-determined power value is smaller than the second pre-determined power value, and both the first pre-determined power value and the second pre-determined power value are smaller than the reference power value.

In an embodiment, the first pre-determined power value may be any value between 10 W and 50 W, and the second pre-determined power value may be any value between 50 W and 100 W. For example, the first pre-determined power value may be 30 W, and the second pre-determined power value may be 80 W.

It can be seen from the above that when the mining machine exits the frequency boosting stage and enters the working stage, the working power of the mining machine does not reach the maximum working power, but is smaller than the maximum working power by at least the first pre-determined power value. The reason that working power of the mining machine is controlled at a level lower than the maximum working power by the end of the frequency boosting stage is that the mining machine may automatically increase the working power while the temperature rises during the subsequent working stage (which is an existing working mechanism of a conventional mining machine, and is within the conventional knowledge). The difference of at least the first pre-determined power value is reserved for the mining machine to further boost the working power during the working stage. After the frequency boosting stage ends, the steps of collecting the input voltage, determining whether the input voltage is lower than the voltage threshold and adjusting the maximum working power as shown in FIG. 1 may be performed once in every unit time period.

The mining machine power adjusting method provided by the disclosure is described below with reference to an implementation example.

Explanations of related terms used in embodiments of the disclosure:

frequency boosting stage: the process during which the frequency increases from an initial lower frequency to a target frequency is the frequency boosting stage, given that the frequency gradually increases when the mining machine starts up;

working stage: a stage during which mining is performed evenly at a fixed frequency following the frequency boosting stage;

maximum working power: the maximum allowable power of a mining machine in the working stage;

input voltage of a mining machine: having an allowable value range between 200 V to 300 V in an example where the alternating current voltage is 220 V;

input current of a mining machine: in an example where the mining machine uses a socket and a wire of 16 A which are designed as a complete set, the input current may be 16 A;

output voltage of a mining machine: in an example where a power supply for the mining machine converts an alternating current voltage of 220 V into a direct current voltage of about 12 V and outputs the direct current voltage to the calculation board, the direct current voltage of 12V is stable during the working stage of the mining machine and does not fluctuate with changes in the input voltage.

In an implementation example:

when the input voltage of the mining machine is lower than 235 V (the voltage threshold), the maximum allowable working power may be pre-determined to be:

input voltage×16 A;

when the input voltage is higher than or equal to 235 V (the voltage threshold), the maximum allowable working power may be pre-determined to be a fixed value, e.g., 235V×16 A=3760W(constrained by the limiting working power of the power supply for the mining machine).

At the beginning of the frequency boosting stage of the mining machine (during startup), the maximum working power may be calculated according to the above method, i.e., when the input voltage of the mining machine is lower than 235 V, the maximum working power of the mining machine equals input voltage×16 A;

when the input voltage of the mining machine is higher than or equal to 235 V, the maximum working power of the mining machine is 3760 W.

The highest target power during the frequency boosting stage is the maximum working power minus 30 W, i.e., when the input voltage of the mining machine is lower than 235 V, the highest target power of the mining machine during the frequency boosting stage equals the input voltage×16 A−30 W;

when the input voltage of the mining machine is higher than or equal to 235 V, the highest target power of the mining machine during the frequency boosting stage equals 3760 W−30 W=3730 W.

The lowest target power during the frequency boosting stage is the maximum working power minus 80 W, i.e., when the input voltage of the mining machine is lower than 235 V, the lowest target power of the mining machine in the frequency boosting stage equals input voltage×16 A−80W;

when the input voltage of the mining machine is higher than or equal to 235 V, the lowest target power of the mining machine during the frequency boosting stage equals

3760 W−80 W=3680 W.

When the frequency boosting stage ends, i.e. the mining machine enters the working stage, the power of the mining machine is controlled between the lowest target power and the highest target power.

During the working process of the mining machine, the power of the mining machine may be constrained below the maximum working power. Once the power of the mining machine exceeds the maximum working power, a protection mechanism which reduces the frequency and the voltage may be triggered to ensure the safe running of the mining machine. When the frequency of the mining machine (i.e. the frequency of the calculation board) and the output voltage stay stable, the higher the temperature of a chip in the calculation board is, the larger the electric leakage of the chip will be, which may further result in higher power consumption. Therefore, the power of the mining machine may fluctuate with temperature fluctuations. Such fluctuation may cause the power of the mining machine to exceed the maximum working power, and may lead to risks against safety due to the excessive power of the mining machine.

During the working process of the mining machine, the running frequency and the output voltage of the mining machine may be dynamically adjusted according to the input voltage every 24 hours, to adjust the maximum working power of the mining machine so that the maximum working power of the mining machine can be adapted to changes in the input voltage, thereby ensure the mining machine to operate under an appropriate input current.

During the working process of the mining machine, the input current of the mining machine may be measured in real time. Once the input current exceeds 110% of 16 A (i.e. 17.6 A), the protection mechanism which reduces the frequency and the voltage may be triggered immediately (i.e. reducing the working frequency and the output voltage of the mining machine), so as to reduce the working power of the mining machine and thereby reduce the input current to ensure the input current is reduced to a safe range of, e.g., within 16 A.

For example:

when the input voltage is 232 V, the allowable maximum working power may be:

232V×16A=3712W.

Then the highest target power during the frequency boosting stage may be:

3712−30=3682W.

The lowest target power during the frequency boosting stage may be:

3712−80=3632W.

Further, the maximum working power of the mining machine may be dynamically adjusted according to the input voltage every 24 hours. When the voltage increases, e.g., increases to 235 V, the maximum working power may be correspondingly increased to:

235V×16A=3760W.

By increasing the working frequency and the output voltage of the mining machine, the working power of the mining machine can be increased to 3760 W to make full use of the allowable maximum working power.

Conventionally, in order to ensure the safety of electricity consumption, the maximum working power of the mining machine is generally controlled to be within at most:

220V×16A=3520W.

By contrast, through the mining machine power adjusting method according to embodiments of the disclosure, if the input voltage is 232 V, the maximum working power can be increased from the conventional 3520 W to 3712 W, which is an overall increase about 5.5%.

By adopting the mining machine power adjusting method according to embodiments of the disclosure, the power of the mining machine can be adjusted according to changes in the input voltage by making full use of the voltage range that is slightly higher than the standard input voltage, thus the calculation power of the mining machine can be greatly increased to generate better mining revenues without significantly increasing the power consumption ratio of the mining machine while ensuring the stable and safe running of the mining machine. For example, when the input voltage is greater than 230 V, the technical scheme of the disclosure can increase the calculation power of a mining machine by more than 5% compared with conventional technical solutions.

The power consumption ratio of the mining machine can be determined by the following formula:

$$\text{mining machine power consumption ratio}(W/T) = \text{mining machine power consumption}(W)/\text{calculation power}(T)$$

When the power consumption ratio of a mining machine is higher, the mining machine is more power-consuming. In general, when a mining machine is at a certain power consumption ratio, the increase ratio of the calculation power may be in a proportional relationship with the increase ratio of the power consumption ratio. For example, at a power consumption ratio of 38 W/T, the ratio of the increase percentage of the calculation power to the increase percentage of the power consumption may be 2.7, that is, when the calculation power is increased by 5.4%, the power consumption ratio may be increased by 2.0%. It can be seen that after adopting the mining machine power adjusting method according to embodiments of the disclosure, when the calculation power is increased by 5.4%, the power consumption ratio is increased by 2.0% correspondingly which is not a significant increase compared with the increase of the calculation power.

Embodiments of the disclosure also provide a non-transitory computer-readable storage medium storing instructions executable by at least one processor to perform the procedures in the mining machine power adjusting method as described above.

The foregoing descriptions are merely some preferred embodiments of the disclosure and are not intended to limit the disclosure. Any modification, substitute equivalent and improvement within the principle of the disclosure should be within the protection scope of the disclosure.

What is claimed is:

1. A mining machine power adjusting method, comprising: when a mining machine is in a working stage,
    collecting an input voltage of the mining machine;
    adjusting a maximum working power of the mining machine to a first power value by controlling a working frequency and an output voltage of the mining machine when the input voltage is lower than a pre-determined voltage threshold; and
    adjusting the maximum working power to a second power value by controlling the working frequency and the output voltage of the mining machine when the input voltage is higher than or equal to the voltage threshold;
    wherein the first power value is a product of the input voltage multiplied by a rated current of the mining machine, and the second power value is a product of the voltage threshold multiplied by the rated current;
    wherein the input voltage of the mining machine is a voltage of an alternating current of a power supply of the mining machine, the output voltage of the mining machine is a voltage output to a calculation board from a power supply module of the mining machine.

2. The mining machine power adjusting method according to claim 1, further comprising:
    performing the steps of collecting the input voltage, determining whether the input voltage is lower than the voltage threshold and adjusting the maximum working power once in each unit time period.

3. The mining machine power adjusting method according to claim 1, further comprising:
    measuring an input current of the mining machine in real time, and reducing the working frequency and the output voltage of the mining machine when the input current exceeds a pre-determined current threshold.

4. The mining machine power adjusting method according to claim 1, further comprising: when the mining machine is in a frequency boosting stage,
    collecting an input voltage of the mining machine when the mining machine starts up;
    determining the first power value to serve as a reference power value for the frequency boosting stage when the input voltage is lower than the voltage threshold;
    determining the second power value to serve as the reference power value when the input voltage is higher than or equal to the voltage threshold;
    determining a target power value range of the mining machine for the frequency boosting stage according to the reference power value; and
    controlling a power value of the mining machine during the frequency boosting stage to be within the target power value range by controlling the working frequency and the output voltage of the mining machine during the frequency boosting stage.

5. The mining machine power adjusting method according to claim 4, wherein determining the target power value range of the mining machine for the frequency boosting stage according to the reference power value comprises:
    determining a difference between the reference power value and a first pre-determined power value to serve as an upper limit of the target power value range; and
    determining a difference between the reference power value and a second pre-determined power value to serve as a lower limit of the target power value range,
    wherein the first pre-determined power value is smaller than the second pre-determined power value, and both the first pre-determined power value and the second pre-determined power value are smaller than the reference power value.

6. The mining machine power adjusting method according to claim 1, wherein
    the voltage threshold is a value between 220 V and 300 V, and the rated current is a value between 10 A and 20 A.

7. The mining machine power adjusting method according to claim 2, wherein
    the unit time period is a value between 1 h and 100 h.

8. The mining machine power adjusting method according to claim 3, wherein
    the current threshold is between 1.05 and 1.2 times of the rated current.

9. The mining machine power adjusting method according to claim 5, wherein
    the first pre-determined power value is a value between 10 W and 50 W; and
    the second pre-determined power value is a value between 50 W and 100 W.

10. A non-transitory computer-readable storage medium, storing instructions executable by at least one processor to perform the steps of the mining machine power adjusting method of claim 1.

\* \* \* \* \*